United States Patent
Miyazaki et al.

(10) Patent No.: US 8,932,765 B2
(45) Date of Patent: Jan. 13, 2015

(54) ELECTRODE ASSEMBLY FOR ELECTRIC STORAGE DEVICE AND ELECTRIC STORAGE DEVICE

(75) Inventors: Akihiko Miyazaki, Kyoto (JP); Sumio Mori, Kyoto (JP); Taro Yamafuku, Kyoto (JP); Minoru Teshima, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 107 days.

(21) Appl. No.: 13/805,469

(22) PCT Filed: Jul. 6, 2011

(86) PCT No.: PCT/JP2011/065494
§ 371 (c)(1),
(2), (4) Date: Dec. 19, 2012

(87) PCT Pub. No.: WO2012/005301
PCT Pub. Date: Jan. 12, 2012

(65) Prior Publication Data
US 2013/0089781 A1      Apr. 11, 2013

(30) Foreign Application Priority Data
Jul. 6, 2010   (JP) ................................. 2010-153896

(51) Int. Cl.
*H01M 4/62* (2006.01)
*H01G 9/04* (2006.01)
(Continued)

(52) U.S. Cl.
CPC ............... *H01G 9/058* (2013.01); *H01M 4/131* (2013.01); *H01M 4/136* (2013.01);
(Continued)

(58) Field of Classification Search
USPC .......... 429/211, 232, 212, 231.1, 223, 231.95
See application file for complete search history.

(56) References Cited

U.S. PATENT DOCUMENTS 5,478,676 A    12/1995   Turi et al.
6,001,139 A *  12/1999   Asanuma et al. ............ 29/623.3
(Continued)

FOREIGN PATENT DOCUMENTS

CA   2658470        2/2008
EP   2048726 A1     4/2009
(Continued)

OTHER PUBLICATIONS

English translation of International Preliminary Report on Patentability dated Jan. 8, 2013 and Written Opinion of the International Searching Authority dated Oct. 11, 2011 filed on PCT/JP2011/065494.

(Continued)

*Primary Examiner* — Mark F Huff
*Assistant Examiner* — Olatunji Godo
(74) *Attorney, Agent, or Firm* — Rankin, Hill & Clark LLP

(57) ABSTRACT

An object is to provide an electrode assembly for an electric storage device, such as a nonaqueous electrolyte cell, and an electric storage device that are capable of preventing increase of a short-circuit current at the time of occurrence of a short-circuit within a cell and have high safety. In order to achieve the object, provided is an electrode assembly for an electric storage device including a positive electrode, a negative electrode and a separator disposed between the positive electrode and the negative electrode, in which at least one of the positive electrode and the negative electrode includes a current collector, an active material layer formed on at least one face of the current collector, and an undercoat layer formed between the current collector and the active material layer and including an organic binder that evaporates and decomposes when heated to a predetermined temperature or more.

17 Claims, 4 Drawing Sheets

(51) Int. Cl.
*H01M 4/131* (2010.01)
*H01M 4/136* (2010.01)
*H01M 4/58* (2010.01)
*H01M 10/0525* (2010.01)
*H01M 10/42* (2006.01)
*H01M 4/66* (2006.01)
*H01G 11/22* (2013.01)
*H01G 11/28* (2013.01)
*H01G 11/30* (2013.01)
*H01M 4/02* (2006.01)

(52) U.S. Cl.
CPC ....... *H01M 4/5825* (2013.01); *H01M 10/0525* (2013.01); *H01M 10/4235* (2013.01); *H01M 4/622* (2013.01); *H01M 4/667* (2013.01); *H01M 4/668* (2013.01); *H01G 11/22* (2013.01); *H01G 11/28* (2013.01); *H01G 11/30* (2013.01); *Y02T 10/7011* (2013.01); *H01M 2004/021* (2013.01); *Y02E 60/122* (2013.01); *Y02T 10/7022* (2013.01); *Y02E 60/13* (2013.01)
USPC ........ 429/232; 429/231.1; 429/211; 429/212; 429/231.95; 429/231.5; 429/213

(56) References Cited

U.S. PATENT DOCUMENTS

| | | | |
|---|---|---|---|
| 6,072,692 | A | 6/2000 | Hiratsuka et al. |
| 6,844,113 | B2 | 1/2005 | Yagi et al. |
| 2002/0177044 | A1 | 11/2002 | Yagi et al. |
| 2005/0147889 | A1* | 7/2005 | Ohzuku et al. ............. 429/231.1 |
| 2007/0025062 | A1* | 2/2007 | Miyaki et al. ................. 361/502 |
| 2009/0104529 | A1* | 4/2009 | Nishino et al. ................ 429/223 |
| 2009/0135547 | A1* | 5/2009 | Nanba et al. .................. 361/502 |
| 2009/0257171 | A1 | 10/2009 | Yamazaki et al. |
| 2010/0129699 | A1 | 5/2010 | Mikhaylik et al. |
| 2011/0091771 | A1* | 4/2011 | Sannan et al. ................ 429/217 |

FOREIGN PATENT DOCUMENTS

| | | |
|---|---|---|
| JP | 2000-012091 | 1/2000 |
| JP | 2000-077061 | 3/2000 |
| JP | 2002-373644 | 12/2002 |
| JP | 2004-288520 | 10/2004 |
| JP | 2008-060060 | 3/2008 |
| JP | 2008-140552 | 6/2008 |
| JP | 2008-171809 | 7/2008 |
| WO | 99/67835 | 12/1999 |
| WO | 2008/015828 A1 | 2/2008 |
| WO | WO 2009/147989 * | 12/2009 |

OTHER PUBLICATIONS

International Search Report, International Application No. PCT/JP2011/065494, 4 pages.
Extended European Search Report dated May 26, 2014 filed in the corresponding European Patent application No. 11803635.9.
Arora, Sanjiv et al. "Comparative degradation kinetic studies of three biopolymers: Chitin, chitosan and cellulose," Archives of Applied Science Research, 2011, vol. 3 Issue 3, pp. 188-201.; Cited in Extended European Search Reprot.
MacGaugh, M. C. et al. "The Thermal Degradation of Acrylic Acid-Ethylene Polymers," Journal of Polymer Science: Part A-1, 1968, vol. 6, pp. 1243-1248; Cited in Extended European Search Report.

* cited by examiner

F I G. 1
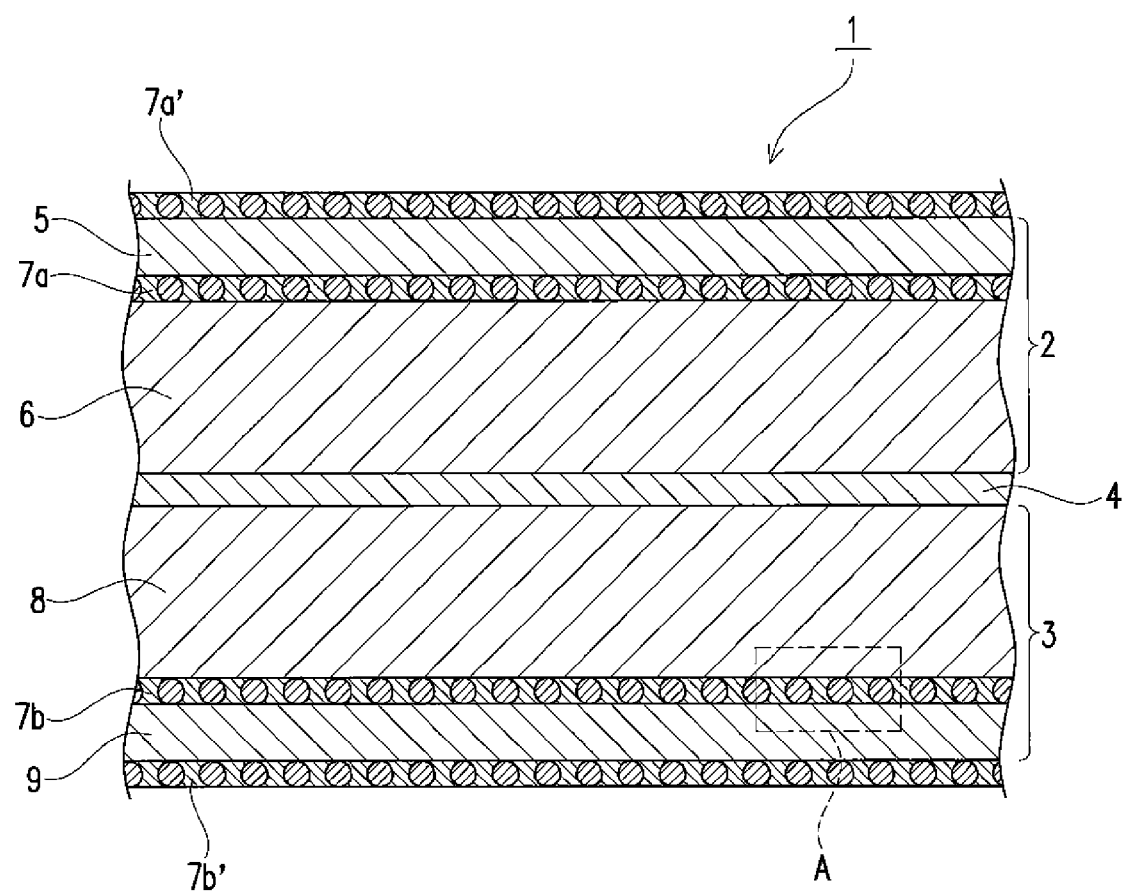

F I G . 2
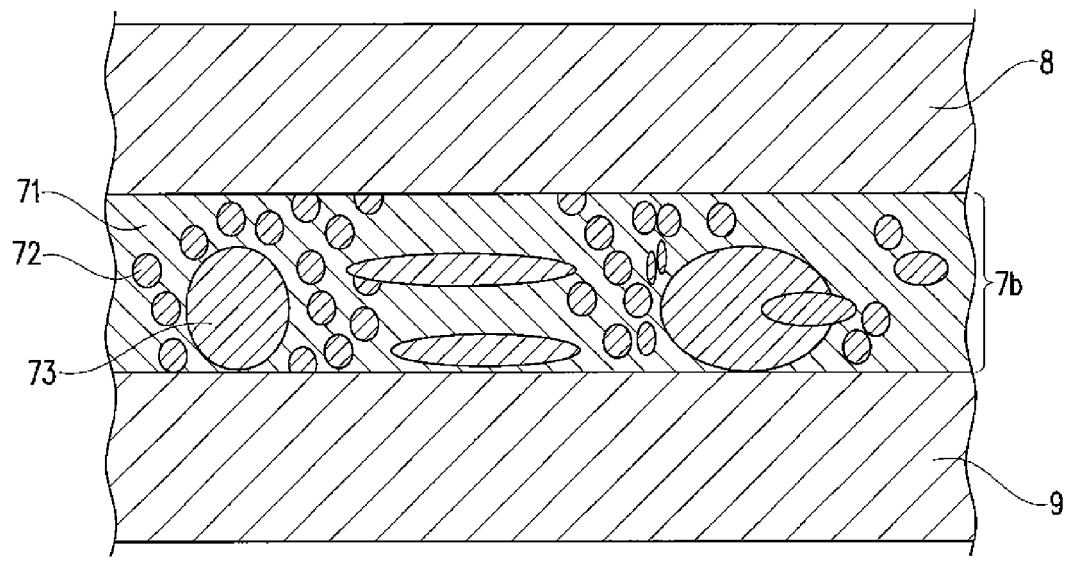

ELECTRODE ASSEMBLY FOR ELECTRIC STORAGE DEVICE AND ELECTRIC STORAGE DEVICE

FIELD OF THE INVENTION

The present invention relates to an electrode assembly for an electric storage device and an electric storage device using the electrode assembly.

RELATED ART

Recently, electric storage devices such as cells including nonaqueous electrolyte cells and capacitors including electric double layer capacitors are frequently used for a variety of purposes.

In particular, nonaqueous electrolyte cells represented by lithium-ion cells are frequently used as cells for general use, for example, in power sources for electronic devices such as personal computers developed to have small size and weight and communication devices including cellular phones, and power sources for vehicles including hybrid electric vehicles (HEV), plug-in hybrid electric vehicles (PHEV) and electric vehicles (EV).

Such cells for general use, particularly, cells used in power sources for the vehicles are required of high safety in addition to characteristics of a high voltage and a high energy density.

The nonaqueous electrolyte cells have a structure in which a negative-electrode current collecting plate of a metal foil is provided with an active material layer for a negative electrode, a positive-electrode current collecting plate is provided with an active material layer for a positive electrode, and the active material layers for the negative electrode and the positive electrode are disposed to oppose each other with a separator for electrically separating them from each other sandwiched therebetween, and are charged/discharged through transfer/receipt of ions between the positive electrode and the negative electrode in a nonaqueous electrolyte.

Since such nonaqueous electrolyte cells have a high voltage and a high energy density and include a combustible liquid, it is necessary to increase the safety.

In particular, it is a significant problem to ensure safety in occurrence of an internal short-circuit which is difficult to externally control.

An internal short-circuit occurs, for example, when conductive penetration (breakage) is caused in the separator due to a failure such as a foreign matter mixed during fabrication, and a short-circuit current flows through a portion having the internal short-circuit.

There is a possibility that local Joule heat is caused within the cell as the short-circuit current increases.

Then, there arises a vicious circle in which this local Joule heat increases the size of the breakage caused in the separator so as to further increase the Joule heat, and as a result, it is apprehended that abnormal overheat may be caused within the cell.

In conventional technique, in occurrence of such a short-circuit, electric resistance within the cell is increased so as to prevent excessive flow of a short-circuit current (see Patent Document 1 and Patent Document 2).

CITATION LIST

Patent Document

Patent Document 1: Japanese Patent Laid-Open No. 2000-77061

Patent Document 2: International Publication No. WO 99/67835

DISCLOSURE OF THE INVENTION

Problems to be Solved by the Invention

Patent Document 1 describes a cell including a high-resistance layer provided between a current collector and an active material layer.

In order to allow such a high-resistance layer to have high resistance, however, it is necessary to place the cell in a high potential state, namely, in an excessively charged state, and therefore, overheat derived from a general internal short-circuit may not be expected to be prevented.

Patent Document 2 describes a cell provided with, between a current collector and an active material layer, a layer including resin that attains high resistance when heated.

In the vicinity of a portion having an internal short-circuit, however, the temperature may be increased to such a high temperature at which the resin may be decomposed, and therefore, it is difficult to retain the high resistance of the resin under such a high temperature condition.

Accordingly, none of the documents describes a technique to sufficiently prevent the overheat caused in occurrence of a short-circuit.

Therefore, an object of the present invention is to provide an electrode assembly for an electric storage device and an electric storage device that are capable of preventing increase of a short-circuit current in occurrence of a short-circuit within a cell and have high safety.

Means for Solving Problems

In order to solve the aforementioned problems, the present inventors provide:

an electrode assembly for an electric storage device including a positive electrode, a negative electrode and a separator disposed between the positive electrode and the negative electrode, in which at least one of the positive electrode and the negative electrode includes:

a current collector;

an active material layer formed on at least one face of the current collector; and an undercoat layer formed between the current collector and the active material layer and including a conductive additive and an organic binder that evaporates or decomposes when heated to a predetermined temperature or more.

In the electrode assembly for an electric storage device of the present invention, the undercoat layer includes the organic binder that evaporates or decomposes when heated to a predetermined temperature or more. Therefore, when an internal short-circuit occurs within the electric storage device and heat is generated due to a short-circuit current in the vicinity of a portion having the internal short-circuit, the organic binder makes the modification as described above (i.e., evaporates or decomposes) due to the heat, and hence, gaps are formed in portions having been occupied by the organic binder in the undercoat layer.

In the gaps thus formed in the undercoat layer, a portion not electrically connected is formed on an interface between the current collector and the active material layer formed on at least one face of the current collector. In such a portion, resistance between the current collector and the active material layer formed on at least one face of the current collector becomes high. Therefore, increase of the short-circuit current may be prevented.

In the present invention, the predetermined temperature is preferably 160° C. to 500° C.

The organic binder is preferably at least one selected from the group consisting of chitin-chitosan derivative, fluoride resin, synthetic rubber, polyamide, polyimide, polyolefin and polyacrylic.

Furthermore, the undercoat layer has a thickness of preferably 0.1 to 10 μm.

Besides, the undercoat layer preferably includes an insulating inorganic agent having a larger particle size than the conductive additive.

When the undercoat layer includes the insulating inorganic agent having a larger particle size than the conductive additive, the insulating inorganic agent is present with a larger height than the conductive additive along a thickness direction between the current collector and the active material layer. Therefore, the current collector and the active material layer may be prevented from coming into contact with each other through the conductive additive, and hence, the increase of the short-circuit current may be sufficiently suppressed.

Furthermore, at least one of the conductive additive and the insulating inorganic agent has an average aspect ratio of preferably 1 or more and 5 or less.

Incidentally, the term aspect ratio herein means a value calculated as (a maximum major axis)/(a width along an orthogonal direction to the maximum major axis) of at least one of the conductive additive and the insulating inorganic agent. More specifically, the aspect ratio herein is an average value of aspect ratios obtained from actually measured values as follows: An SEM image corresponding to a length of 0.1 mm of the undercoat layer is observed with a scanning electron microscope (SEM), 5 particles are arbitrarily selected from the conductive additive and/or the insulating inorganic agent observed within the image, and the maximum major axes and the widths along the orthogonal direction to the maximum major axes of the respective particles are actually measured, so as to obtain the aspect ratios.

Furthermore, the active material preferably has higher hardness than the undercoat layer.

It is noted that the hardness of the active material and the hardness of the undercoat layer are herein hardnesses measured by the following measurement methods.

(Hardness of Active Material)

The hardness of the active material herein means average hardness Csa (MPa) of 5 samples obtained in accordance with the following formula by using fracture test force Pa (mN) and a particle size Da (μm) measured by an indentation test performed in accordance with JIS R1639-5:

$$Csa = 2.48 \times Pa/(\pi \times Da^2)$$

(Hardness of Undercoat Layer)

The hardness of the undercoat layer herein means average hardness Csu (MPa) obtained in arbitrary 5 points in accordance with the following formula by using test force Pu (mN) and a particle size Du (μm) attained with 1% variation measured by the indentation test performed in accordance with JIS R1639-5:

$$Csu = Pu/(\pi \times Du^2)$$

Furthermore, the organic binder is included in a content of preferably 20 to 80 mass % based on all the materials for the undercoat layer.

Also, the conductive additive is included in a content of preferably 5 to 50 mass % based on all the materials for the undercoat layer.

The undercoat layer preferably has a maximum thickness $T_{max}$ and a minimum thickness $T_{min}$ satisfying the following relationship of:

$$T_{max} - T_{min} > (1/4) T_{max}$$

and a portion of the undercoat layer having a thickness T smaller than $(1/20)T_{max}$ is preferably 10% or less in the whole undercoat layer.

Moreover, the undercoat layer is preferably formed, in the positive electrode, between the current collector and the active material layer for the positive electrode, and an active material included in the active material layer for the positive electrode is preferably a compound represented by $Li_{1-a}MO_2$ (wherein 0≤a≤1, and M is at least one element selected from the group consisting of Ni, Mn, Ti, Cr, Fe, Co, Cu, Zn, Al, Ge, Sn, Mg, Mo and Zr).

Alternatively, the undercoat layer is preferably formed, in the positive electrode, between the current collector and the active material layer for the positive electrode, and an active material included in the active material layer for the positive electrode is preferably a compound represented by $Li_{1-a}Ni_xM1_yM2_zO_2$ (wherein 0≤a≤1, each of M1 and M2 is at least one element selected from the group consisting of Mn, Ti, Cr, Fe, Co, Cu, Zn, Al, Ge, Sn, Mg, Mo and Zr, M1≠M2, x+y+z=1, x≤1, y<1 and z<1).

Furthermore, the active material represented by $Li_{1-a}Ni_xM1_yM2_zO_2$ is preferably a compound represented by $LiNi_xMn_yCo_zO_2$ (wherein x+y+z=1, x<1, y<1 and z<1).

Alternatively, the undercoat layer is preferably formed, in the positive electrode, between the current collector and the active material layer for the positive electrode, and an active material included in the active material layer for the positive electrode is preferably a compound represented by $LiMPO_4$ (wherein M is at least one element selected from the group consisting of Fe, Mn and Co).

Moreover, the active material represented by $LiMPO_4$ is preferably $LiFePO_4$.

Additionally, the present invention provides an electric storage device including the aforementioned electrode assembly.

Advantages of the Invention

According to the present invention, when an internal short-circuit occurs within an electric storage device and heat derived from a short-circuit current is caused in the vicinity of a portion having the short-circuit, resistance between the current collector and the active material layer becomes high. Therefore, according to the present invention, increase of the short-circuit current may be prevented so as to prevent the inside of the cell from being continuously heated.

BRIEF DESCRIPTION OF THE DRAWINGS

FIG. 1 is a schematic cross-sectional view illustrating a structure of an electrode assembly according to an embodiment of the present invention.

FIG. 2 is an enlarged schematic cross-sectional view of a portion A of FIG. 1 illustrating the structure of the electrode assembly of the embodiment.

DETAILED DESCRIPTION OF THE PREFERRED EMBODIMENT

Figure 3A:
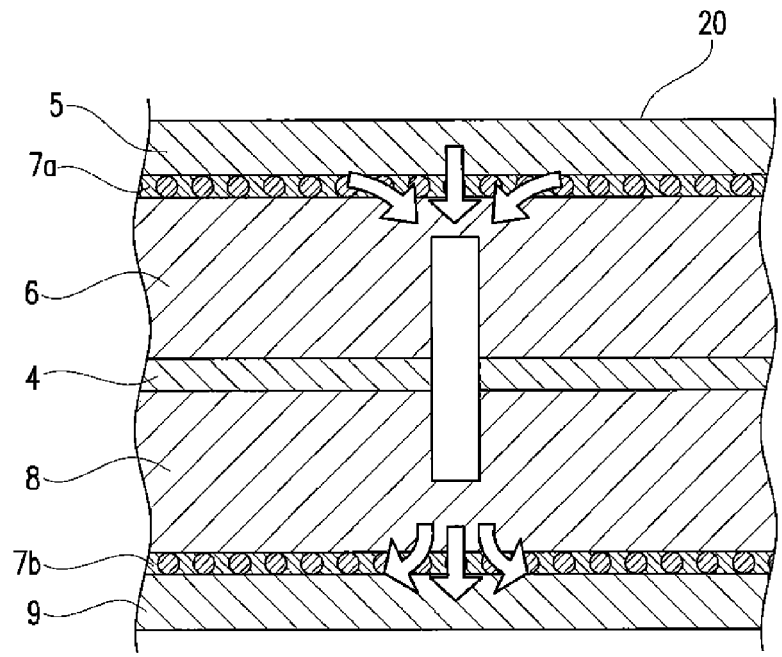
FIG. 3 is a schematic cross-sectional view illustrating a state where a short-circuit occurs in the electrode assembly of the embodiment.

Now, an electrode assembly and an electric storage device using the electrode assembly according to an embodiment of the present invention will be described with reference to FIGS. 1 to 5.

An electrode assembly 1 for an electric storage device of the present embodiment is an electrode assembly for an electric storage device including a positive electrode 2, a negative electrode 3 and a separator 4 disposed between the positive electrode 2 and the negative electrode 3, and at least one of the positive electrode 2 and the negative electrode 3 includes a current collector, an active material layer formed on at least one face of the current collector, and undercoat layers 7a, 7a', 7b and 7b' formed between the current collector and the active material layer and including a conductive additive 72 and an organic binder 71 that evaporates or decomposes when heated to a predetermined temperature or more.

The electrode assembly 1 of the present embodiment is used as an electrode assembly for an electric storage device such as a nonaqueous electrolyte secondary cell.

The positive electrode 2 and the negative electrode 3 of the electrode assembly 1 of the present embodiment are laminated with the separator 4 sandwiched therebetween as illustrated in FIG. 1.

The positive electrode 2 includes a positive-electrode current collecting plate 5 working as a current collector for a positive electrode, the undercoat layers 7a and 7a' formed on both faces of the positive-electrode current collecting plate 5, and a positive electrode active material layer 6 working as an active material layer for the positive electrode laminated on one undercoat layer 7a out of the undercoat layers 7a and 7a'.

The negative electrode 3 includes a negative-electrode current collecting plate 9 working as a current collector for a negative electrode, the undercoat layers 7b and 7b' formed on both faces of the negative-electrode current collecting plate 9, and a negative electrode active material layer 8 working as an active material layer for the negative electrode laminated on one undercoat layer 7b out of the undercoat layers 7b and 7b'.

Although the undercoat layers are formed on the both faces of the positive-electrode current collecting plate 5 and the negative-electrode current collecting plate 9 in the present embodiment, the undercoat layers may be provided on merely one of the faces facing the active material layers of the positive-electrode current collecting plate 5 and the negative-electrode current collecting plate 9.

In addition, another positive electrode active material layer may be provided on an outer face side of the positive electrode 2 of FIG. 1 (namely, on an outer face side of the undercoat layer 7a') and another negative electrode active material layer may be provided on an outer face side of the negative electrode 3 of FIG. 1 (namely, on an outer face side of the undercoat layer 7b').

As the positive-electrode current collecting plate 5, for example, a metal foil such as an aluminum foil may be used, and as the negative-electrode current collecting plate 9, for example, a metal foil such as a copper foil may be used.

The positive-electrode current collecting plate 5 has a thickness of preferably 5 to 50 µm, and the negative-electrode current collecting plate 9 has a thickness of preferably approximately 3 to 50 µm.

The surfaces of the positive-electrode current collecting plate 5 and the negative-electrode current collecting plate 9 may be subjected to a coupling treatment or another surface treatment for improving adhesion onto the positive electrode active material layer 6 and the negative electrode active material layer 8.

FIG. 2 is a partially enlarged schematic cross-sectional view of the undercoat layer 7b disposed on a side of the negative electrode 3.

Since the undercoat layers 7a and 7a' for the positive electrode 2 and the undercoat layers 7b and 7b' for the negative electrode 3 have the same structure, the undercoat layer disposed on the side of the negative electrode will be exemplarily described in the present embodiment.

Each of the undercoat layers 7b and 7b' includes the organic binder 71 and the conductive additive 72.

Each of the undercoat layers 7b and 7b' of the present embodiment further includes an insulating inorganic agent 73 having a larger particle size than the conductive additive 72 in a preferable aspect.

Each of the undercoat layers 7b and 7b' has a thickness of approximately 0.1 to 10 µm and preferably approximately 2 to 5 µm.

When the thickness falls in this range, the undercoat layer may be easily applied.

Moreover, when the undercoat layer has the thickness in this range, electric resistance within a cell may be kept at a sufficient level for practical use.

When the undercoat layer is heated to a predetermined temperature or more, the organic binder 71 evaporates or decomposes, so as to cause electric disconnection between the current collector (that is, the negative-electrode current collecting plate 9 in the present embodiment) and the active material layer formed on one face of the current collector (that is, the negative electrode active material layer 8 in the present embodiment).

In the present embodiment, the predetermined temperature is, for example, approximately 160° C. to 500° C.

Specifically, the organic binder preferably has a property to start evaporating or decomposing when the temperature is elevated to approximately 160° C. to 500° C.

In the present embodiment, that the organic binder starts evaporating or decomposing means that the organic binder included in the undercoat layer starts modification through which at least a part thereof is lost.

Moreover, in the present embodiment, the electric disconnection between the current collector and the active material layer means that a portion occupied by the organic binder in the undercoat layer is changed into a gap through the evaporation or decomposition of the organic binder.

In such a state, for example, the mass of the organic binder is reduced by 15% to 20% or more.

Alternatively, in such a state, a resistance value between the current collector and the active material layer is approximately 300Ω to 1000Ω in terms of surface electrical resistance measured by a two-probe method.

A material for the organic binder 71 may be resin that improves adhesion between the negative-electrode current collecting plate 9 and the negative electrode active material layer 8 in a room temperature state and reduces its volume through evaporation, decomposition or the like as described above when heated to the predetermined temperature or more The material for the organic binder 71 is preferably a resin that is not evaporated or decomposed through a heat treatment performed in a preparation process of the electrode assembly, such as a process for applying materials for the positive electrode and negative electrode active material layers.

Moreover, the material for the organic binder 71 is preferably resin having properties required when used in an electrode assembly, namely, properties that it is not decomposed in an electrolyte, has oxidation-reduction resistance, is capable of following volume expansion occurring in charging/discharging, and provides an interface with each active material layer not broken through expansion/shrinkage of the active material layer.

The resin usable as the material for the organic binder 71 is at least one selected from the group consisting of chitin-chitosan derivative, fluoride resin, synthetic rubber, polyamide, polyimide, polyolefin and polyacrylic.

Specifically, the chitin-chitosan derivative is, for example, at least one hydroxyalkylchitosan selected from the group consisting of hydroxyethylchitosan, hydroxypropylchitosan, hydroxybutylchitosan and alkylated chitosan.

Examples of the fluoride resin include polyvinylidene fluoride and polytetrafluoroethylene.

Examples of the synthetic rubber include styrene butadiene rubber, acrylic rubber and nitrile rubber.

Examples of the polyolefin include low-density polyethylene, high-density polyethylene and polypropylene.

Examples of the polyacrylic include ethylene glycol dimethacrylate and propylene glycol dimethacrylate.

The hydroxyalkylchitosan is preferably mixed and crosslinked with an organic acid such as salicylic acid, pyromellitic acid, citric acid or trimellitic acid to be used as the organic binder.

The organic binder is preferably used in a content in a range of 20 to 80 mass % and preferably 50 to 75 mass % based on all the materials for the undercoat layer.

When the organic binder is included in the undercoat layer in the aforementioned content, the following advantages may be attained at the time of occurrence of an internal short-circuit and at ordinary times:

At the time of the occurrence of an internal short-circuit, the organic binder occupying a given volume in the whole volume of the undercoat layer is evaporated or decomposed, so as to form gaps to an extent to increase the resistance on the interface between the current collecting plate and the active material layer, and thus, an insulating property may be ensured.

On the other hand, at ordinary times, the adhesion strength of the undercoat layer is improved so that adhesion on the interface may be ensured and electric conductivity may be retained.

As the conductive additive 72, particles with high electric conductivity are used.

The conductive additive 72 is, for example, at least one selected from the group consisting of carbon materials such as carbon black, acetylene black and ketjen black and metal particulates of iron, nickel, copper, aluminum and the like.

The conductive additive 72 is preferably used in a content in a range of 5 to 50 mass % and preferably 10 to 30 mass % based on all the materials for the undercoat layer.

When the conductive additive is included in the undercoat layer in the aforementioned content, appropriate conductivity may be retained.

As the insulating inorganic agent 73, particles of an inorganic material that has a higher insulating property than the conductive additive 72 and is not decomposed when the inside of the cell is heated due to an internal short-circuit, for example, at a temperature ranging from room temperature to 150° C. may be used.

As the insulating property, the insulating inorganic agent preferably has electric conductivity of $10^{-4}$ S/m or less and preferably $10^{-6}$ S/m or less.

The insulating inorganic agent 73 is, for example, at least one selected from the group consisting of oxide ceramics, nitride ceramics, other ceramics, metal oxides and the like.

Examples of the oxide ceramics include zirconia, magnesia, ceria, yttria, zinc oxide and iron oxide.

Examples of the nitride ceramics include silicon nitride, titanium nitride and boron nitride.

Examples of other ceramics include silicon carbide, calcium carbonate, aluminum sulfate, potassium titanate, talc, kaolin clay, kaolinite, halloysite, pyrophyllite, montmorillonite, sericite, mica, amesite, bentonite, asbestos, zeolite, calcium silicate, magnesium silicate, diatomite, ceramics of silica sand or the like, and ceramics of glass fiber or the like.

Examples of the metal oxides include alumina, silica, titanium oxide, zirconia, calcium oxide, magnesia, ceria, lanthanum oxide and manganese oxide.

The insulating inorganic agent 73 is preferably used in a content in a range of 10 to 75 mass % based on all the materials for the undercoat layer from the viewpoint of ensuring the insulating property.

Further preferably, the insulating inorganic agent is included in the content within the aforementioned range and in a mass substantially twice as much as that of the conductive additive 72 from the viewpoint of ensuring the insulating property.

As for the relationship in particle size between the conductive additive 72 and the insulating inorganic agent 73, the insulating inorganic agent 73 preferably has a larger particle size than the conductive additive 72.

The carbon materials and the metal particulates usable as the conductive additive 72 have a particle size of approximately 0.01 to 0.5 μm.

Therefore, the particle size of the insulating inorganic agent 73 is larger and is 0.1 to 3 μm and preferably approximately 1 μm.

Furthermore, the particle size of the insulating inorganic agent 73 is preferably 2.5 times or more as large as that of the conductive additive 72.

This is because an insulating state may be definitely retained when the particle sizes differ from each other to this extent.

It is noted that the particle sizes of the conductive additive 72 and the insulating inorganic agent 73 are values measured by a laser diffraction method in the present embodiment.

Specifically, the particle sizes of the conductive additive 72 and the insulating inorganic agent 73 are values of D50 measured by using a particle size distribution analyzer of a laser diffraction apparatus, and more specifically, are values of a volume-cumulative median particle size (D50) obtained by diluting the respective particles with a predetermined solvent, performing ultrasonication on the thus diluted particle solutions and subjecting the resultant solutions to measurement with a laser diffraction apparatus.

Specifically, in the present embodiment, a 0.001 mass % diluted dispersion solution (with N-methylpyrrolidone used as a solvent) of each of the conductive additive and the insulating inorganic agent was prepared, and a particle size distribution in the dispersion solution was measured by using a laser diffraction apparatus (name: "SALD-2000J" manufactured by Shimadzu Corporation) so as to obtain a value to be used as the particle size.

At least one of the conductive additive 72 and the insulating inorganic agent 73 has an average aspect ratio of preferably 1 or more and 5 or less.

The term average aspect ratio herein means a value calculated, with respect to the conductive additive and the insulating inorganic agent, as (a maximum major axis)/(a width along an orthogonal direction to the maximum major axis), and specifically is an average value of aspect ratios obtained from actually measured values as follows: An SEM image corresponding to a length of 0.1 mm of the undercoat layer is observed with a scanning electron microscope (SEM), 5 particles are arbitrarily selected in the conductive additive and/or the insulating inorganic agent observed within the image, and the maximum major axes and the widths along the orthogonal direction to the maximum major axes of the respective particles are actually measured, so as to obtain the aspect ratios.

Furthermore, as an SEM image, an image obtained by using a scanning electron microscope (name: JSM-7001F, manufactured by JEOL Ltd.) with magnifying power of 5000 to 50000 (with the intensity of incident electron beams set to 5 to 20 keV) was used in the present embodiment.

Preferably, the average aspect ratio of at least one of the conductive additive and the insulating inorganic agent is 1 or more and 5 or less and preferably 3 or less.

When the conductive additive has the aspect ratio within the aforementioned range, the conductive additive may be prevented from penetrating through the undercoat layer in pressing the electrode, so as to prevent the current collector and the active material layer from being electrically connected to each other.

A content of the organic binder and a content of the insulating inorganic agent preferably satisfy the following formula. When they are included in such contents based on all the materials for the undercoat layer, the insulating property may be effectively ensured.

$$Wb' > Wb - (26/74) \times Db \times (Wf/Df)$$

Wb: initial amount of binder
Wb': reduced amount of binder
Db: density of binder
Wf: weight of insulating inorganic agent
Df: density of insulating inorganic agent
74: ratio (%) of filled portions in closest sphere packing structure (fcc, hcp)
26: ratio (%) of unfilled portions in closest sphere packing structure (fcc, hcp); namely, a value obtained by subtracting the ratio 74 of the filled portions from 100%.

The undercoat layer of the present embodiment may include a dispersion solvent for dispersing the organic binder 71, the conductive additive 72 and the insulating inorganic agent 73.

Examples of the dispersion solvent include organic solvents such as N-methylpyrrolidone and toluene, water and mixtures of them.

The undercoat layer is formed by, for example, a method in which the organic binder, the conductive additive and the insulating inorganic agent are mixed with the organic solvent, the thus obtained mixed solution is applied onto both faces of the metal foils used as the current collectors for the positive and negative electrodes, and the resultant foils are dried so as to suitably form the undercoat layer thereon.

An amount of mixed solution to be applied is preferably adjusted so that the undercoat layer attains, after drying, a thickness of 0.1 to 10 μm and preferably approximately 2 to 5 μm as described above.

A method for applying the mixed solution is not particularly limited, but the mixed solution is preferably applied in an arbitrary thickness and an arbitrary shape by employing, for example, roller coating with a comma roll, a gravure coater, an applicator roller and the like, a die head coater, spray coating, screen coating, a doctor blade method, spin coating, and a bar coater.

The undercoat layer of the present embodiment has an irregular or uneven shape on the interface with the active material layer.

Such an irregular or uneven shape is formed by applying a pressure in a thickness direction by using a press or the like for compression bonding respective layers after applying the material for the undercoat layer onto the current collector and further applying the material for the active material layer for the positive electrode or the negative electrode.

Specifically, on the interface between the undercoat layer and the active material layer, the active material included in the active material layer is embedded in the organic binder included in the undercoat layer during the compression bonding, resulting in forming the irregular or uneven shape on the interface between the undercoat layer and the active material layer.

The undercoat layer has a maximum thickness $T_{max}$ and a minimum thickness $T_{min}$ preferably satisfying a relationship of $T_{max} - T_{min} > (1/4)T_{max}$, and a portion of the undercoat layer having a thickness T smaller than $(1/20)T_{max}$ is preferably 10% or less in the whole undercoat layer.

In the present embodiment, the maximum thickness $T_{max}$ and the minimum thickness $T_{min}$ of the undercoat layer are actually measured values obtained, in an SEM cross-sectional image of the electrode assembly, in a thickest portion of the undercoat layer as the maximum thickness $T_{max}$ and in a thinnest portion as the minimum thickness $T_{min}$.

It is noted that an image obtained by using a scanning electron microscope (name: JSM-7001F, manufactured by JEOL Ltd.) with magnifying power of 5000 to 50000 (with the intensity of incident electron beams set to 5 to 20 keV) was used as the SEM image.

Incidentally, a value $((T_{max} - T_{min}) \div T_{max})$ obtained by dividing a difference, $T_{max} - T_{min}$, between the maximum thickness $T_{max}$ and the minimum thickness $T_{min}$ of the undercoat layer by the thickness $T_{max}$ is designated as an irregularity (uneven) ratio in the present embodiment.

The interface between the undercoat layer and the active material layer is preferably in a shape having an irregularity (uneven) ratio of 1/4 or more.

Figure 5:
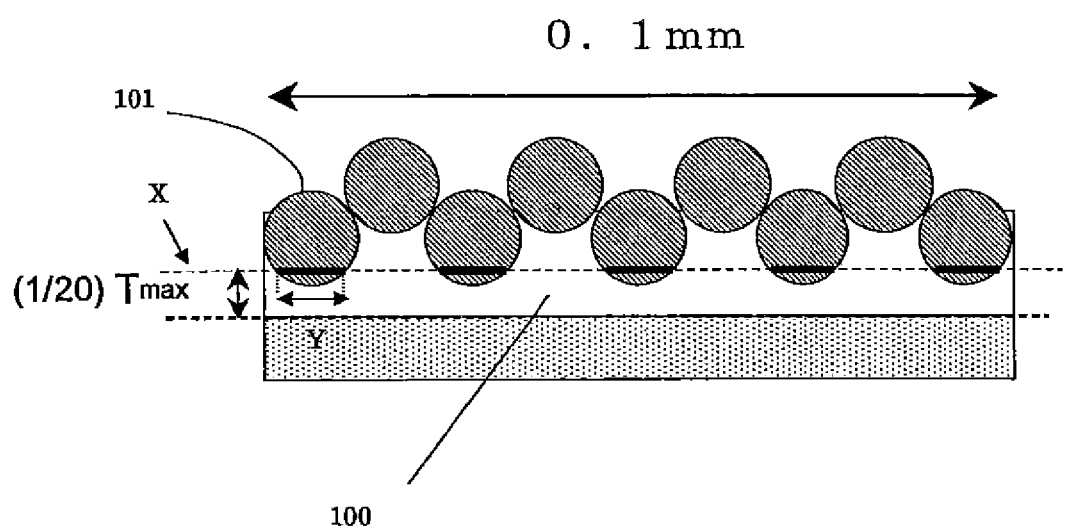
FIG. 5 is a schematic cross-sectional view illustrating a portion in the vicinity of an interface between an undercoat layer and an active material layer.

A portion of the undercoat layer having a thickness T smaller than $(1/20)T_{max}$ being 10% or less in the whole undercoat layer corresponds to, for example, the following case:

In a schematic diagram of an SEM cross-sectional image of an electrode assembly as illustrated in FIG. 5, a line X is drawn in a position corresponding to 1/20 of the maximum thickness $T_{max}$ of an undercoat layer 100, and lengths of crossing lines Y in each of which the line X crosses an active material 101 present in the position of the line X are added up.

For example, assuming that the SEM cross-sectional image has a length of 0.1 mm along an electrode face of the electrode assembly, when the sum of the lines Y drawn within the length of 0.1 mm is 10% or less of 0.1 mm, namely, 0.01 mm or less, a portion of the undercoat layer 100 having a thickness T smaller than $(1/20)T_{max}$ is 10% or less in the whole undercoat layer, namely, on the line X.

It is noted that a ratio of the sum of the crossing lines Y in the whole length of the line X is designated as a contact length ratio in the present embodiment.

When the maximum thickness $T_{max}$ and the minimum thickness $T_{min}$ of the undercoat layer satisfy the relationship of $T_{max} - T_{min} > (1/4)T_{max}$ and the portion of the undercoat layer having a thickness T smaller than ($\frac{1}{20}$)$T_{max}$ is 10% or less in the whole undercoat layer, namely, when the undercoat layer has an irregularity (uneven) ratio of 1/4 or more and a contact length ratio of 10% or less, the following advantage is attained:

When the organic binder included in the undercoat layer is evaporated or decomposed due to heat generated in occurrence of a short-circuit so as to form gaps in the undercoat layer, even if an external pressure or the like is applied to press the active material layer and the current collector to each other in the thickness direction, the current collector and the active material are in contact with each other in merely a small area, and therefore, a short-circuit current flowing through gap portions of the undercoat layer may be suppressed.

In order to provide the interface between the undercoat layer and the active material layer with the above-described irregular or uneven shape, for example, the hardness of the active material included in the active material layer formed on at least one face of the current collector is set to be higher than the hardness of the undercoat layer.

In the present embodiment, the hardness of the active material means average hardness Csa (MPa) of 5 samples obtained in accordance with the following formula by using fracture test force Pa (mN) and a particle size Da (μm) measured by an indentation test performed in accordance with JIS R1639-5:

$$Csa = 2.48 \times Pa/(\pi \times Da^2)$$

Also, in the present embodiment, the hardness of the undercoat layer means average hardness Csu (MPa) obtained in arbitrary 5 points in accordance with the following formula by using test force Pu (mN) and a particle size Du (μm) attained with 1% variation measured by the indentation test performed in accordance with JIS R1639-5:

$$Csu = Pu/(\pi \times Du^2)$$

As a positive electrode active material used in the positive electrode active material layer of the present embodiment, for example, when it is used as the electrode assembly of a lithium cell, a compound capable of occluding/releasing lithium is preferably used.

Alternatively, when the undercoat layer of the present embodiment is provided between the active material layer and the current collector for the positive electrode, the active material included in the active material layer for the positive electrode is preferably a compound represented by a general formula, $Li_{1-a}MO_2$ (wherein $0 \leq a \leq 1$, and M is at least one element selected from the group consisting of Ni, Mn, Ti, Cr, Fe, Co, Cu, Zn, Al, Ge, Sn, Mg, Mo and Zr).

Alternatively, when the undercoat layer of the present embodiment is provided between the active material layer and the current collector for the positive electrode, the active material included in the active material layer for the positive electrode may be a compound represented by $Li_{1-a}Ni_xM1_yM2_zO_2$ (wherein $0 \leq a \leq 1$, each of M1 and M2 is at least one element selected from the group consisting of Mn, Ti, Cr, Fe, Co, Cu, Zn, Al, Ge, Sn, Mg, Mo and Zr, M1≠M2, x+y+z=1, x≤1, y<1 and z<1).

Furthermore, the compound represented by $Li_{1-a}Ni_xM1_yM2_zO_2$ is preferably a compound represented by $LiNi_xMn_yCo_zO_2$ (wherein x+y+z=1, x<1, y<1 and z<1).

Alternatively, when the undercoat layer of the present embodiment is provided between the active material layer and the current collector for the positive electrode, the active material included in the active material layer for the positive electrode is preferably a compound represented by $LiMPO_4$ (wherein M is at least one element selected from the group consisting of Fe, Mn and Co).

A specific example of the compound represented by $LiMPO_4$ is $LiFePO_4$.

As other examples of the positive electrode active material, when, for example, it is used as the electrode assembly of a lithium cell, a composite oxide of a compound capable of occluding/releasing lithium and represented by a general formula, $Li_bM_2O_4$ (wherein M is a transition metal and $0 \leq b \leq 2$), an oxide having tunnel-shaped pores or a metal chalcogenide having a layered structure may be used.

Specific examples of the active materials, apart from the aforementioned $LiFePO_4$, are preferably powders of positive electrode materials such as lithium cobalt oxide ($LiCoO_2$), lithium nickelate ($LiNiO_2$), lithium manganate ($LiMn_2O_4$), $MnO_2$, $FeO_2$, $V_2O_5$, $V_6O_{13}$, $TiO_2$ and $TiS_2$.

In using the aforementioned active materials for the positive electrode, there may arise problems in which conductivity is comparatively low and adhesion to the current collector is comparatively low and hence contact resistance between the active material layer and the current collector tends to be large. However, when the undercoat layer including the conductive additive is provided between the active material layer for the positive electrode using any of the aforementioned active materials and the current collector for the positive electrode, the problems may be suppressed.

A negative electrode active material used in the active material layer for the negative electrode of the present embodiment is a powder of at least one negative electrode material selected from the group consisting of, for example, a lithium metal, lithium alloys (lithium metal-containing alloys such as lithium-aluminum, lithium-lead, lithium-tin, lithium-aluminum-tin, lithium-gallium and Wood's metal), alloys capable of occluding/releasing lithium, carbon materials (such as graphite, hard carbon, low temperature sintered carbon and amorphous carbon), metal oxides, lithium metal oxides (such as $Li_4Ti_5O_{12}$, etc.) and polyphosphoric acid compounds.

The powders of the positive electrode and negative electrode active materials preferably have an average particle size of 100 μm or less. In particular, the powder of the positive electrode active material has an average particle size of preferably 50 μm or less and more preferably 10 μm or less from the view point of electron conductivity.

In order to obtain each of the powders with a predetermined size in a predetermined shape, a grinder or a classifier is used.

The powders of the positive electrode and negative electrode active materials may be mixed with other components such as a conducting agent, a binding agent, a thickening agent and a filler.

The conducting agent is not limited as far as it is an electron conducting material not harmfully affecting cell performances. The conducting agent is, for example, at least one or more selected from the group consisting of conductive materials such as natural graphite (including scaly graphite, flake graphite, amorphous graphite and the like), artificial graphite, carbon black, acetylene black, ketjen black, carbon whisker, carbon fiber, metal powders (of copper, nickel, aluminum, silver, gold and the like), metal fiber, and conductive ceramics.

The binding agent is at least one or more selected from the group consisting of thermoplastic resins such as polytetrafluoroethylene (PTFE), polyvinylidene fluoride (PVDF), polyethylene and polypropylene; and polymers having rubber elasticity such as ethylene-propylene-diene rubber (EPDM), sulfonated EPDM, styrene butadiene rubber (SBR) and fluororubber.

The thickening agent is at least one or more selected from the group consisting of polysaccharides such as carboxymethyl cellulose and methyl cellulose.

Besides, when a thickening agent having a functional group reacted with lithium like the saccharides is used, the functional group is preferably deactivated through, for example, methylation.

The filler is not limited as far as it is a material not harmfully affecting the cell performances.

The filler is, for example, at least one or more selected from the group consisting of olefin polymers such as polypropylene and polyethylene; amorphous silica; alumina; zeolite; glass; carbon and the like.

The powder of the active material and the other components are kneaded and mixed with an organic solvent such as N-methylpyrrolidone or toluene, whereby obtaining a mixed solution.

The mixed solution is applied onto or compression bonded onto the undercoat layer formed in the aforementioned manner and subjected to a heat treatment at a temperature of approximately 50° C. to 150° C. for approximately 2 hours, and thus, the positive electrode and the negative electrode respectively having the positive electrode and negative electrode active material layers are prepared.

Examples of the separator 4 are woven fabric, nonwoven fabric and synthetic resin microporous films.

The synthetic resin microporous films are particularly preferably used.

Among the synthetic resin microporous films, polyolefin microporous films such as microporous films of polyethylene and polypropylene, microporous films of polyethylene and polypropylene conjugated with aramid or polyimide, and microporous films obtained by combining them are preferred because such films have thicknesses, film strengths, film resistance and the like suitable as the material for the separator.

The electrode assembly 1 of the present embodiment is prepared by providing (laminating) the positive electrode and the negative electrode so as to have the active material layer for the positive electrode and the active material layer for the negative electrode oppose each other with the separator 4 sandwiched therebetween as described above, and this electrode assembly 1 is wound and accommodated in a cell case together with a nonaqueous electrolyte, and thus, a nonaqueous electrolyte cell (for example, a nickel lithium cell) corresponding to an electric storage device is fabricated.

In the nonaqueous electrolyte cell including the electrode assembly 1, the separator may be electrically penetrated so as to cause an internal short-circuit 20 as illustrated in FIG. 3(a) due to, for example, a conductive foreign matter mixed during the fabrication.

In such a case, a current flows through a portion having the internal short-circuit, and when the current continuously flows, the temperature within the cell becomes high owing to Joule heat.

Figure 3B:
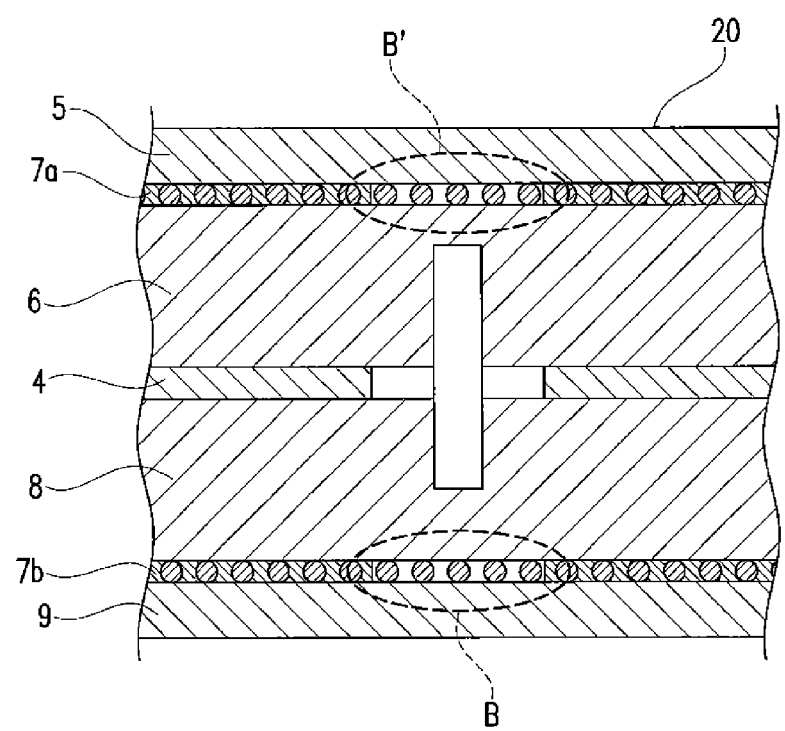

In the cell using the electrode assembly of the present embodiment, when the temperature is increased to approximately 160° C. to 300° C., the organic binder included in the undercoat layer is evaporated into a gas or decomposed by the heat and is reduced in the volume, and therefore, gaps are formed in the undercoat layers 7a and 7b as illustrated in FIG. 3(b).

Portions having these gaps form, on the interface between the positive-electrode current collecting plate 5 and the positive electrode active material layer 6 and on the interface between the negative-electrode current collecting plate 9 and the negative electrode active material layer 8, portions B and B' where the undercoat layers 7a and 7b lack the organic binder 71, and the resistance becomes high in these portions, so as to prevent a current from flowing beyond the portions.

Figure 4:
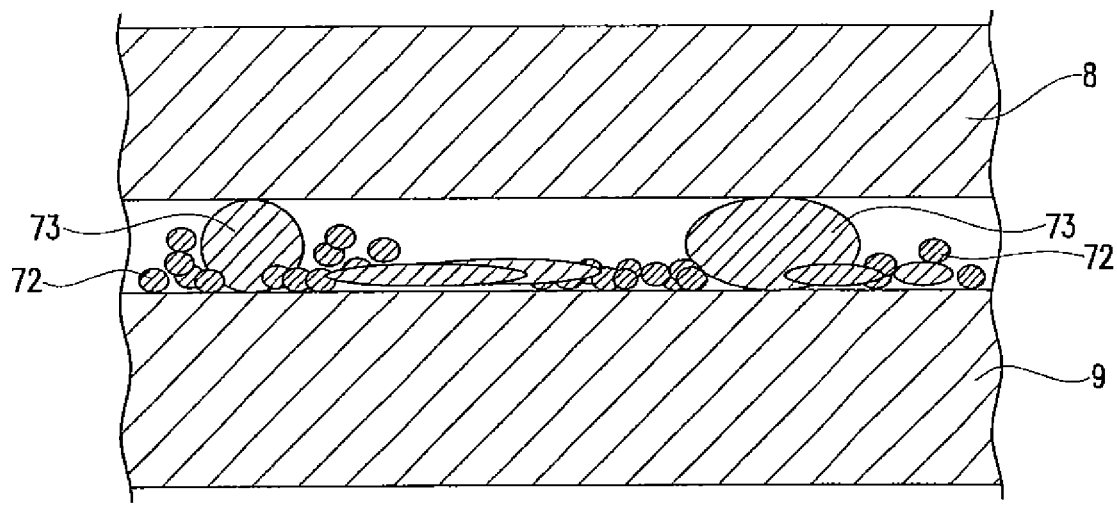
FIG. 4 is an enlarged schematic cross-sectional view of a portion B of FIG. 3(b) illustrating the state where a short-circuit occurs in the electrode assembly of the embodiment.

Furthermore, since the undercoat layers 7a and 7b include the insulating inorganic agent 73 having a larger particle size than the conductive additive 72, when the organic binder 71 included in the undercoat layers 7a and 7b are evaporated or reduced in the volume so as to form the portions B and B' lacking the organic binder 71, the insulating inorganic agent 73 is sandwiched between the current collector 9 and the active material layer 8 so as to be present as a spacer as illustrated in FIG. 4. Accordingly, the current collector 9 and the active material layer 8 may be prevented from being electrically connected to each other through the conductive additive 72, so that high resistivity may be retained.

Moreover, in the case where the interface between the undercoat layer 7a and the positive electrode active material layer 6 and the interface between the undercoat layer 7b and the negative electrode active material layer 8 are provided with an irregular or uneven shape, even when the electrode assembly 1 is pressed in the thickness direction by, for example, external pressing force or the like so as to bring the active material layer and the current collector into contact with each other in the portions B and B', a contact area therebetween may be small, and hence, a short-circuit current may be suppressed.

EXAMPLES

The present invention will now be described more specifically by exemplarily describing examples and a comparative example, but the present invention is not limited to the following examples.

Example 1

A mixed solution for an undercoat layer was prepared by using the following materials.

50 mass % of chitosan (hydroxyethyl chitosan) working as an organic binder, 20 mass % of acetylene black (having an aggregate particle size less than 500 nm) working as a conductive additive and 5 mass % of aluminum oxide ($Al_2O_3$ having an aggregate particle size less than 1 μm) working as an insulating inorganic agent were mixed with a dispersion solvent (N-methylpyrrolidone), so as to give a mixed solution.

The mixed solution was applied in a thickness of 10 μm onto an aluminum foil having a thickness of 20 μm, and the resultant was dried at 160° C., so as to form an undercoat layer with a thickness of 3 μm.

In arbitrary 5 points on the undercoat layer, the hardness Csu (MPa) was measured, and the hardness was 5 MPa on average.

$LiNi_{1/3}Mn_{1/3}Co_{1/3}O_2$ working as a positive electrode active material, acetylene black working as a conductive additive and polyvinylidene fluoride (PVDF) working as a binder for a positive electrode active material layer were mixed in a mass ratio of 90:5:5, and the thus obtained mixture was further mixed with a dispersion solvent (N-methylpyrrolidone), so as to give an active material paste for a positive electrode.

This paste was applied onto a top face of the undercoat layer having been formed on the aluminum foil, and the resultant was dried and pressed, whereby preparing a positive electrode.

It is noted that the positive electrode active material had hardness Csa (MPa) of 50 MPa (as an average of 5 samples)

measured by using fracture test force Pa (mN) and a particle size Da (μm) as described above.

Besides, the positive electrode active material had a particle size of approximately 5 μm.

The particle size was a value obtained through measurement, with a laser diffraction apparatus (name: "SALD-2000J" manufactured by Shimadzu Corporation), of a particle size distribution in a 0.001 mass % diluted dispersion solution of the positive electrode active material (with a solvent of N-methyl pyrrolidone).

In an SEM cross-sectional image corresponding to a length of 0.1 mm of the thus obtained positive electrode, the irregularity (uneven) ratio and the contact length ratio were measured, resulting in finding that the irregularity (uneven) ratio was 0.3 and the contact length ratio was 0%.

Next, graphite working as a negative electrode active material and polyvinylidene fluoride (PVDF) working as a binder for a negative electrode active material layer were mixed in a mass ratio of 95:5, and the thus obtained mixture was further mixed with a dispersion solvent (N-methylpyrrolidone), so as to give an active material paste for a negative electrode.

This paste was applied onto a copper foil with a thickness of 15 μm, and the resultant was dried and pressed, whereby preparing a negative electrode.

As an electrolyte, a mixture of ethylene carbonate and dimethyl carbonate including lithium hexafluorophosphate (LiPF$_6$) dissolved therein was used.

An electrode assembly fabricated by laminating and winding the positive electrode, the negative electrode and a separator was placed in an aluminum case together with the electrolyte, and the resultant was subjected to an aging process, whereby fabricating a cell.

Example 2

A cell was fabricated in the same manner as in Example 1 except that a positive electrode was prepared so as to attain an irregularity (uneven) ratio of 0.9 by using the positive electrode active material having a particle size of approximately 10 μm.

Example 3

A cell was fabricated in the same manner as in Example 1 except that a positive electrode was prepared so as to attain an irregularity (uneven) ratio of 0.1 by using the positive electrode active material having a particle size of approximately 1 μm.

Example 4

A cell was fabricated in the same manner as in Example 1 except that a positive electrode was prepared so as to attain an irregularity (uneven) ratio of 1.0 and a contact length ratio of 5% by using the positive electrode active material having a particle size of approximately 15 μm.

Example 5

A cell was fabricated in the same manner as in Example 1 except that a positive electrode was prepared so as to attain an irregularity (uneven) ratio of 1.0 and a contact length ratio of 15% by using the positive electrode active material having a particle size of approximately 20 μm.

Example 6

A cell was fabricated in the same manner as in Example 1 except that LiCoO$_2$ was used as an active material for a positive electrode.

Example 7

A cell was fabricated in the same manner as in Example 1 except that LiNiO$_2$ was used as an active material for a positive electrode.

Example 8

A cell was fabricated in the same manner as in Example 1 except that LiFePO$_4$ coated with carbon was used as an active material for a positive electrode.

Example 9

A cell was fabricated in the same manner as in Example 1 except that LiNi$_{1/6}$Mn$_{1/6}$Co$_{2/3}$O$_2$ coated with carbon was used as an active material for a positive electrode.

Comparative Example 1

A cell was fabricated in the same manner as in Example 1 except that no undercoat layer was provided in a positive electrode.

Each of the cells of the respective examples and comparative example were charged up to a fully charged state, and the resultant cells were subjected to a nail penetration test in which each cell was penetrated by a stainless steel nail having a diameter of 1 mm by a depth of 5 mm in a thermostat bath set to 65° C.

An increase ratio (%) of cell temperature obtained after the nail penetration test is listed in Table 1.

It is noted that the increase ratio of the temperature corresponds to a ratio of the cell temperature of each cell obtained after the nail penetration test assuming the temperature of the cell of Example 1 as 100.

TABLE 1

| | Irregularity ratio | Contact length ratio (%) | Positive electrode active material | Temperature increase ratio (%) |
|---|---|---|---|---|
| Example 1 | 0.3 | 0 | L$_{1/3}$iNi$_{1/3}$Mn$_{1/3}$CoO$_2$ | 100 |
| Example 2 | 0.9 | 0 | | 98 |
| Example 3 | 0.1 | 0 | | 120 |
| Example 4 | 1.0 | 5 | | 105 |
| Example 5 | 1.0 | 15 | | 150 |
| Example 6 | 0.3 | 0 | LiCoO$_2$ | 180 |
| Example 7 | 0.3 | 0 | LiNiO$_2$ | 200 |
| Example 8 | 0.3 | 0 | Carbon-coated LiFePO$_4$ | 90 |
| Example 9 | 0.3 | 0 | LiNi$_{1/6}$Mn$_{1/6}$Co$_{2/3}$O$_2$ | 120 |
| Comparative Example 1 | — | — | LiNi$_{1/3}$Mn$_{1/3}$Co$_{1/3}$O$_2$ | 220 |

It is obvious from results shown in Table 1 that the temperature increase is suppressed in the cells of the examples as compared with that in the cell of the comparative example.

Furthermore, internal resistance measured in the cell of Example 1 was 0.5 to 5Ω, which is negligible for practical use.

Surface electrical resistance values (obtained by a two-probe method) before and after a heat treatment at 700° C. for 180 seconds were measured in the positive electrode of the cell of Example 1, resulting in finding that the resistance value was 14Ω before the heat treatment and was largely increased to 1900Ω after the heat treatment.

When the positive electrode of Example 1 was observed after the heat treatment, the active material layer for the positive electrode was found to be peeled off from the aluminum foil in some portions.

REFERENCE SIGNS LIST

1: electrode assembly
2: positive electrode
3: negative electrode
4: separator
5, 9: current collector
6: positive electrode active material layer
7a, a', b, b': undercoat layer
71: organic binder
73: insulating inorganic agent
8: negative electrode active material layer

The invention claimed is:

1. An electrode assembly for an electric storage device comprising a positive electrode, a negative electrode and a separator disposed between the positive electrode and the negative electrode,
wherein at least one of the positive electrode and the negative electrode includes:
a current collector;
an active material layer formed on at least one face of the current collector; and
an undercoat layer formed between the current collector and the active material layer and including a conductive additive and an organic binder that evaporates or decomposes when heated to a predetermined temperature, the undercoat layer further including an insulating inorganic agent, a particle size of the insulating inorganic agent being about 2.5 times or more as large as a particle size of the conductive additive.

2. The electrode assembly for an electric storage device according to claim 1,
wherein the predetermined temperature is 160° C. to 500° C.

3. The electrode assembly for an electric storage device according to claim 1,
wherein the organic binder is at least one selected from the group consisting of chitin-chitosan derivative, fluoride resin, synthetic rubber, polyamide, polyimide, polyolefin and polyacrylic.

4. The electrode assembly for an electric storage device according to claim 1,
wherein the undercoat layer has a thickness of 0.1 to 10 μm.

5. The electrode assembly for an electric storage device according to claim 1,
wherein at least one of the conductive additive and the insulating inorganic agent has an average aspect ratio of 1 or more and 5 or less.

6. The electrode assembly for an electric storage device according to claim 1, wherein the active material layer has higher hardness than the undercoat layer.

7. The electrode assembly for an electric storage device according to claim 1,
wherein the organic binder is included in a content of 20 to 80 mass % based on all the materials for the undercoat layer.

8. The electrode assembly for an electric storage device according to claim 1,
wherein the conductive additive is included in a content of 5 to 50 mass % based on all the materials for the undercoat layer.

9. The electrode assembly for an electric storage device according to claim 1,
wherein the undercoat layer has a maximum thickness $T_{max}$ and a minimum thickness $T_{min}$ satisfying a relationship of:

$$T_{max} - T_{min} > (1/4) T_{max}$$

and
a portion of the undercoat layer having a thickness T smaller than $(1/20) T_{max}$ is 10% or less in the whole undercoat layer.

10. The electrode assembly for an electric storage device according to claim 1,
wherein the undercoat layer is formed, in the positive electrode, between the current collector and the active material layer for the positive electrode, and an active material included in the active material layer for the positive electrode is a compound represented by $Li_{1-a}MO_2$ (wherein $0 \leq a \leq 1$, and M is at least one element selected from the group consisting of Ni, Mn, Ti, Cr, Fe, Co, Cu, Zn, Al, Ge, Sn, Mg, Mo and Zr).

11. The electrode assembly for an electric storage device according to claim 1,
wherein the undercoat layer is formed, in the positive electrode, between the current collector and the active material layer for the positive electrode, and an active material included in the active material layer for the positive electrode is a compound represented by $Li_{1-a}Ni_xM1_yM2O_2$ (wherein $0 \leq a \leq 1$, each of M1 and M2 is at least one element selected from the group consisting of Mn, Ti, Cr, Fe, Co, Cu, Zn, Al, Ge, Sn, Mg, Mo and Zr, M1≠M2, x+y+z=1, x≤1, y<1 and z<1).

12. The electrode assembly for an electric storage device according to claim 11,
wherein the active material is $LiNi_xMn_yCo_zO_2$ (wherein x+y+z=1, x<1, y<1 and z<1).

13. The electrode assembly for an electric storage device according to claim 1,
wherein the undercoat layer is formed, in the positive electrode, between the current collector and the active material layer for the positive electrode, and an active material included in the active material layer for the positive electrode is a compound represented by $LiMPO_4$ (wherein M is at least one element selected from the group consisting of Fe, Mn and Co).

14. The electrode assembly for an electric storage device according to claim 13,
wherein the active material is $LiFePO_4$.

15. An electric storage device comprising an electrode assembly according to claim 1.

16. An electrode assembly for an electric storage device comprising a positive electrode, a negative electrode and a separator disposed between the positive electrode and the negative electrode,
wherein at least one of the positive electrode and the negative electrode includes:
a current collector;
an active material layer formed on at least one face of the current collector; and
an undercoat layer formed between the current collector and the active material layer and including a conductive additive and an organic binder that evaporates or decomposes when heated to a predetermined temperature, wherein the undercoat layer has a maximum thickness $T_{max}$ and a minimum thickness $T_{min}$ satisfying a relationship of: $T_{max}-T_{min}>(¼)T_{max}$.

17. An electrode assembly for an electric storage device comprising a positive electrode, a negative electrode and a separator disposed between the positive electrode and the negative electrode, wherein at least one of the positive electrode and the negative electrode includes:

a current collector;

an active material layer formed on at least one face of the current collector; and an undercoat layer formed between the current collector and the active material layer and including a conductive additive and an organic binder that evaporates or decomposes when heated to a predetermined temperature, wherein the undercoat layer has a maximum thickness $T_{max}$ and a minimum thickness $T_{min}$ satisfying a relationship of: $T_{max}-T_{min}>(¼)T_{max}$, and a portion of the undercoat layer having a thickness T smaller than $(1/20)T_{max}$ is 10 or less in the whole undercoat layer.

* * * * *

UNITED STATES PATENT AND TRADEMARK OFFICE
CERTIFICATE OF CORRECTION

| | | |
|---|---|---|
| PATENT NO. | : 8,932,765 B2 | Page 1 of 1 |
| APPLICATION NO. | : 13/805469 | |
| DATED | : January 13, 2015 | |
| INVENTOR(S) | : Akihiko Miyazaki et al. | |

It is certified that error appears in the above-identified patent and that said Letters Patent is hereby corrected as shown below:

In the claims

Column 18, Lines 34 to 35, (Claim 11), delete

"$Li_{1-a}Ni_xM1_yM2O_2$"

and insert

--$Li_{1-a}Ni_xM1_yM2_zO_2$--.

Column 19, Line 23, (Claim 17), delete

"10or"

and insert

--10% or--.

Signed and Sealed this
Twenty-fourth Day of November, 2015

Michelle K. Lee
*Director of the United States Patent and Trademark Office*